Feb. 27, 1940.   R. W. LOHMAN   2,191,765
TEMPERATURE INDICATOR FOR WELLS
Filed July 2, 1938
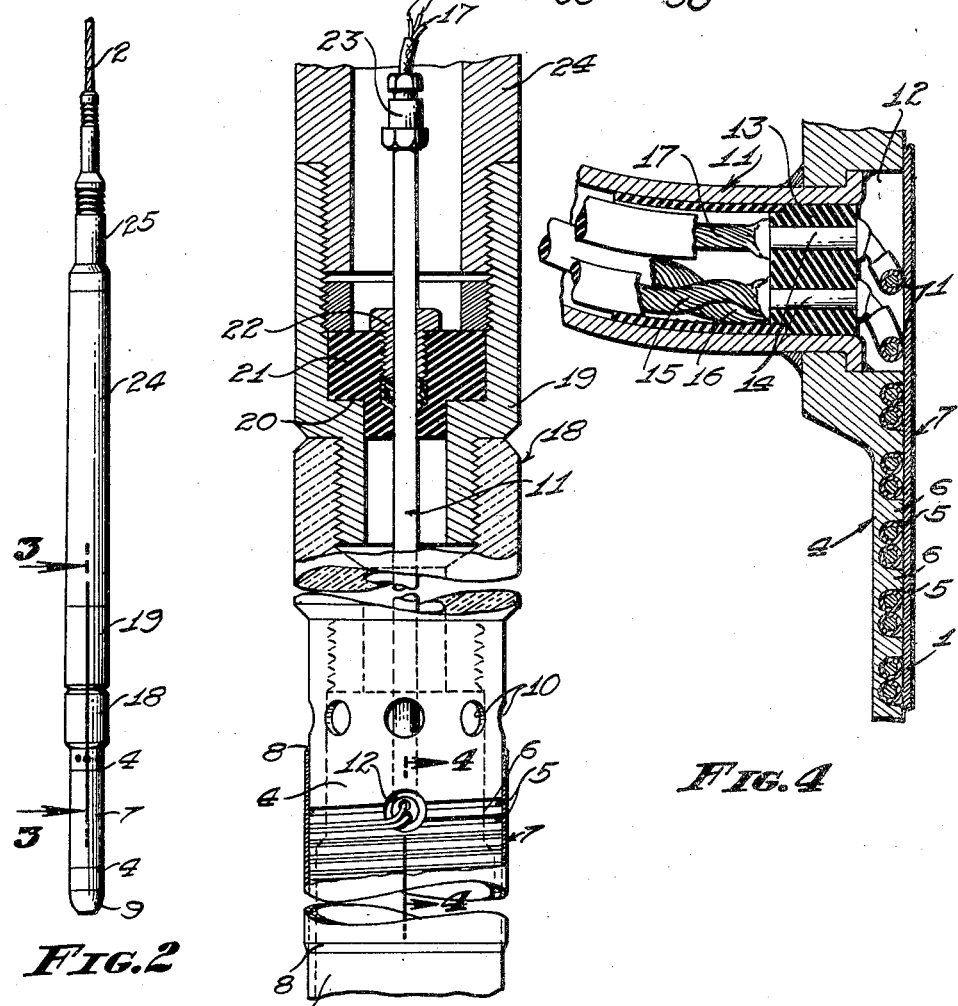

Patented Feb. 27, 1940

2,191,765

UNITED STATES PATENT OFFICE 2,191,765

TEMPERATURE INDICATOR FOR WELLS

Ralph W. Lohman, South Pasadena, Calif., assignor to Lane-Wells Company, Los Angeles, Calif., a corporation of Delaware Application July 2, 1938, Serial No. 217,119

4 Claims. (Cl. 73—362)

My invention relates to temperature indicators for wells, and among the objects of my invention are:

First, to provide a temperature indicator which is capable of being immersed to great depths in liquid without danger of collapsing, or leaking, due to the great hydrostatic pressures encountered;

Second, to provide a temperature indicator which has a minimum time-temperature lag and is, therefore, capable of measuring the relatively rapid changes of temperature encountered as the device is lowered or raised in a well bore on a conductor cable or wire line, thus greatly reducing the time required to conduct, for example, a temperature survey of a well;

Third, to provide a temperature indicator of this character which is capable of measuring temperature over a wide range, but is likewise capable of measuring with accuracy slight fluctuations in temperature;

Fourth, to provide a temperature indicator which employs a thermally responsive resistance wire coil and a special tubular container therefor, so constructed that the well fluid has complete contact with both the inner and outer surfaces of the container, not only to provide efficient heat transfer between the well fluid and the wire coil but also to minimize the crushing effect of well fluid at great depths;

Fifth, to provide a temperature indicator wherein the tubular container for the resistance wire comprises two thin cylinders, one having a groove of dimensions just large enough to receive the convolutions of wire which form the temperature indicating coil, and the other adapted to fit over the first and bear against ribs, or lands, formed on the tubing between the convolutions of the coil, thereby providing distribution of load from the outer cylinder to the inner cylinder, and vice versa, and leaving only a minimum of unsupported area between the two cylinders or sleeves, such design thereby eliminating all destructive hydrostatic pressure effects from the tubes themselves and from the wire and its insulation;

Sixth, to provide a temperature indicator which is so arranged that it may be supported on an electric conductor cable in such a manner that variations in the resistance of the electric cable will have no effect on the accuracy or reading of the temperature indicator;

Seventh, to provide a temperature indicator which is particularly adapted for operation in conjunction with a surface recording apparatus associated with the electric conductor cable from which the temperature indicator is suspended; and Eighth, to provide a temperature indicator which is devoid of electrical contacts, diaphragms, liquid expansible columns, or other moving parts, and which gives its indications primarily in electrical units which may be accurately translated into temperature units.

With the above and other objects in view, as may appear hereinafter, reference is made to the accompanying drawing, in which:

Figure 1 is a wiring diagram illustrating the manner in which my temperature indicator is connected in a circuit with a Wheatstone bridge or other suitable means whereby a reading or record may be obtained;

Figure 2 is a reduced elevational view of my temperature indicator as it appears when suspended on a conductor cable;

Figure 3 is an enlarged, fragmentary, sectional view thereof, taken through 3—3 of Figure 2, with parts and portions shown in elevation to facilitate the illustration; and Figure 4 is an exaggerated, fragmentary, sectional view through 4—4 of Figure 3, illustrating particularly the cross section through the resistance wire housing at the point where such resistance wires are brought into a conductor tube for connection to the electric cable.

My invention consists essentially of a temperature indicating coil 1 adapted to be lowered by an electric cable 2 while in electrical association with an indicator circuit 3. The temperature indicating coil 1 is formed from wire having the property of varying its resistivity materially with changes in temperature, so that by noting the changes in resistance of the coil the temperature thereof and the surrounding fluid in the well may be determined.

The coil 1 is wound about an inner shell 4 having a helical groove 5 separated by a helical rib 6. The groove 5 is preferably of a depth equal to the insulated diameter of the wire comprising the coil and wide enough to accommodate two such wires. The wire forming the coil 1 is doubled in the middle and beginning at the bottom of the inner shell is wound thereabout in the groove 5. The resistance wire is preferably predipped or coated with a thin tough insulating material, and after being wound in the groove 5 is covered by an outer shell 7 which fits snugly over the inner shell 4 and is supported by the ribs 6 so that at no point is the outer shell unsupported for a distance greater than the width of the groove 5. The ends of the outer shell extend beyond the groove 5, and sealing material 8 is applied to hermetically seal the two shells together. Such sealing material may be solder or the like. Both the inner and outer shells 4 and 7 are made as thin as possible and formed from material having high heat diffusivity; for example, copper, or better still, silver. The space between the inner and outer shells which is not actually occupied by the wires 1 may be filled with a material of high thermal diffusivity, for example, such as hydrogen.

The lower end of the inner shell 4 receives a perforated end plug 9 and its upper portion above the outer shell 7 is provided with ports 10 so that the well fluids may circulate upwardly through the inner shell, as well as along the surface of the outer shell. By reason of the fact that the hydrostatic pressure is applied equally from the inside as well as the outside of the shells, or case formed thereby, the shells may be constructed of extremely thin material without danger that they may rupture or collapse, even from extreme hydrostatic pressures. Consequently, there is very little inertia or lag in the response of the temperature indicator. In actual tests, a temperature indicator constructed as disclosed hereinbefore and employing copper tubing of greater thickness than actually necessary for the shells, was immersed in a liquid. Within 10 seconds the indicated temperature reached 95% of the actual temperature of the liquid, clearly indicating that, by suitable design, such as reduction of air space in the winding groove and high thermal diffusivity of both the wire insulation and the material comprising the shells (for instance, substitution of silver for copper), the time-lag required to reach a 95% value may be reduced to one second or less.

The upper portion of the inner shell within the outer shell 7, but beyond the effective portion of the coil 1, may be increased in thickness, or strength, and provided with an opening therethrough in which is sealed the end of a conductor tube 11. The inner shell is preferably provided with a recess 12 accommodating the end of the conductor tube and intersected by the groove 5 so that the wires of the coil may be readily brought to the conductor tube. This end of the conductor tube is provided with an insulation plug 13 through which extend terminals 14. A pair of such terminals are provided, one for each end of the coil 1. Within the conductor tube 11, however, there are shown three cable leads 15, 16 and 17 which are electrical continuations of the conductors provided in the cable 2. The leads 15 and 16 are joined to one of the terminals 14, while the lead 17 is joined to the other terminal. The purpose of so connecting the leads and their association with the indicator circuit 3 will be described hereinafter.

The upper end of the inner shell 4 is internally threaded to receive the lower end of heat-insulating fitting 18 which, in turn, is internally threaded at its upper end to receive the lower end of a metal fitting 19. The upper end of the fitting 19 is internally threaded and a shoulder 20 is formed therein, against which rests a partition member 21 of insulating material, in which is provided a packing gland 22. The conductor tube 11 extends upwardly through the packing gland 22, and its upper end is provided with another packing gland 23 which clamps around the leads 15, 16 and 17. The upper end of the fitting member 19 is threaded on a sinker bar 24, having a bore therethrough to accommodate the cable leads and adapted to be connected at its upper end to a suitable cable head 25 (having terminal means not shown), for electrically connecting the leads 15, 16 and 17 with the conductor of the cable.

The three cable leads are connected with the indicator circuit 3, which may take the form of a Wheatstone bridge. Cable lead 15 is connected through a fixed resistance 26, slide wire 27, fixed resistance 28, slide wire 29, and fixed resistance 30 to lead 17. Lead 16 is connected through battery 31 and slide wire contact 32 to the slide wire 29. A galvanometer 33, or other indicating or recording device, is connected to the bridge in the conventional manner as shown.

The structure to the circuit described above constitutes a standard double slide wire Wheatstone bridge, and may be used as an "in balance" or "off balance" indicator; if operated in balance, or with no current flowing in the indicator circuit, the system is, of course, independent of battery voltage fluctuations. Also, by reason of the three-wire lead connection between the thermometer coil and the bridge, as indicated in Figure 1, automatic compensation for temperature changes in the leads themselves is effected. In this connection, it should be borne in mind that in actual practice a recording instrumentality (not shown, but of any conventional design) is associated, either directly or through suitable amplifying means, with the Wheatstone bridge circuit 3 for the purpose of obtaining a graph or chart of temperature fluctuations or temperature drift that may occur within the well bore.

Although I have shown and described a particular embodiment of my invention, I do not wish to be limited thereto, but desire to include in the scope of my invention the constructions, combinations and arrangements substantially as set forth in the appended claims.

I claim:

1. A temperature indicator for wells, comprising: a helical resistance coil adapted to change its resistance in response to change in its temperature; a high pressure-resistance case therefor comprising relatively thin outer and inner shells covering the outer and inner sides of said coil and contacting each other between convolutions of said coil and forming bridges of rudimentary cross section over the convolutions of said coil, capable of withstanding extreme hydrostatic pressure, the outer and inner surfaces of said outer and inner shells, respectively, being exposed to well pressures; and means electrically associated with said coil for indicating the temperature thereof.

2. A temperature indicator for wells, comprising: a helical resistance coil adapted to change its resistance in response to change in its temperature; a tubular case through and around which well fluids may flow, said case being formed of material having high heat diffusivity and comprising relatively thin inner and outer shells, one being grooved to receive convolutions of said coil and the other covering said coil, said shells contacting each other between convolutions of said coil and forming bridges of rudimentary cross section over the convolutions of said coil, capable of withstanding extreme hydrostatic pressure; and means electrically associated with said coil for indicating the temperature thereof.

3. A temperature indicator for wells, comprising: a helical resistance coil adapted to change its resistance in response to change in its temperature; a tubular case of material having high heat diffusivity and having interior and exterior heat transfer surfaces, said case comprising relatively thin inner and outer shells sealed together at their extremities and defining a helical coil receiving channel for snug accommodation of said coil, said shells being supported, one by the other, between said grooves and forming bridges of rudimentary cross section over the convolutions of said coil, capable of withstanding extreme hydrostatic pressure; and means electrically associated with said coil for indicating the temperature thereof.

4. A temperature indicator for wells, comprising: a helical resistance coil adapted to change its resistance in response to change in its temperature; a tubular case through and around which well fluids may flow, said case being formed of material having high heat diffusivity and comprising relatively thin inner and outer shells, one being grooved to receive convolutions of said coil and the other covering said coil, said shells contacting each other between convolutions of said coil to withstand the crushing load of extreme hydrostatic pressure; a substance having high heat diffusivity completely filling the voids between said coil and case; and means for measuring variations of resistance occurring in said coil by reason of changes in the temperature thereof.

RALPH W. LOHMAN.